United States Patent
Imai et al.

(10) Patent No.: US 10,625,675 B2
(45) Date of Patent: Apr. 21, 2020

(54) LANE DEPARTURE JUDGMENT APPARATUS, LANE DEPARTURE WARNING APPARATUS AND VEHICLE CONTROL SYSTEM USING THE SAME

(71) Applicant: Clarion Co., Ltd., Saitama-shi, Saitama (JP)

(72) Inventors: Masato Imai, Tokyo (JP); Masayuki Takemura, Tokyo (JP); Shoji Muramatsu, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 244 days.

(21) Appl. No.: 14/411,946

(22) PCT Filed: Jun. 17, 2013

(86) PCT No.: PCT/JP2013/066576
§ 371 (c)(1),
(2) Date: Dec. 30, 2014

(87) PCT Pub. No.: WO2014/007052
PCT Pub. Date: Jan. 9, 2014

(65) Prior Publication Data
US 2015/0336510 A1  Nov. 26, 2015

(30) Foreign Application Priority Data
Jul. 3, 2012 (JP) .................. 2012-149863

(51) Int. Cl.
*B60R 1/00* (2006.01)
*H04N 7/18* (2006.01)
(Continued)

(52) U.S. Cl.
CPC .................. *B60R 1/00* (2013.01); *G06T 7/73* (2017.01); *G08G 1/167* (2013.01); *H04N 7/183* (2013.01);
(Continued)

(58) Field of Classification Search
CPC . B60R 1/00; B60R 2300/10; B60R 2300/804; G06T 2207/30256; G06T 7/0042; G08G 1/167; H04N 7/183
(Continued)

(56) References Cited

U.S. PATENT DOCUMENTS 6,308,123 B1 * 10/2001 Ikegaya ............... B62D 1/28
 180/422
8,055,445 B2 * 11/2011 Schiffmann ........... G01S 13/931
 701/117
(Continued)

FOREIGN PATENT DOCUMENTS

EP  2 549 458 A1  1/2013
JP  63-214900 A  9/1988
(Continued)

OTHER PUBLICATIONS

Extended European Search Report issued in counterpart European Application No. 13812543.0 dated Feb. 11, 2016 (Seven (7) pages).
(Continued)

*Primary Examiner* — Tat C Chio
*Assistant Examiner* — Joon Kwon
(74) *Attorney, Agent, or Firm* — Crowell & Moring LLP

(57) ABSTRACT

A lane departure judgment apparatus is configured to detect a lane-dividing line based on image information output from an image-capturing device that acquires an image of an area outside a vehicle, and to judge whether or not departure of the vehicle from the lane-dividing line occurs based on a distance between the vehicle and the lane-dividing line, wherein when an angle of the vehicle with respect to the lane-dividing line thus detected is constant, the distance between the vehicle and the lane-dividing line to be used to judge whether or not departure of the vehicle occurs is changed according to whether the vehicle is being driven on
(Continued)

a road having a lane-dividing width that is greater than a predetermined width or on a road having a lane-dividing width that is smaller than a predetermined width.

6 Claims, 10 Drawing Sheets

(51) Int. Cl.
G08G 1/16 (2006.01)
G06T 7/73 (2017.01)
(52) U.S. Cl.
CPC ..... B60R 2300/10 (2013.01); B60R 2300/804 (2013.01); G06T 2207/30256 (2013.01)
(58) Field of Classification Search
USPC ........................................ 348/148
See application file for complete search history.

(56) References Cited

U.S. PATENT DOCUMENTS

| | | | | |
|---|---|---|---|---|
| 8,836,492 | B2* | 9/2014 | Akiyama | B60W 30/18145 340/436 |
| 2002/0041229 | A1* | 4/2002 | Satoh | G05D 1/0246 340/438 |
| 2003/0174054 | A1* | 9/2003 | Shimomura | G01S 7/415 340/435 |
| 2004/0016870 | A1* | 1/2004 | Pawlicki | B60K 31/0008 250/208.1 |
| 2004/0183663 | A1* | 9/2004 | Shimakage | G06T 7/73 340/436 |
| 2004/0186650 | A1* | 9/2004 | Tange | B60T 8/17557 701/96 |
| 2004/0186651 | A1* | 9/2004 | Tange | B60K 31/04 701/96 |
| 2004/0257244 | A1* | 12/2004 | Kubota | B62D 15/0285 340/932.2 |
| 2005/0107939 | A1* | 5/2005 | Sadano | B60T 8/17557 701/70 |
| 2006/0047390 | A1* | 3/2006 | Scherl | B62D 15/025 701/41 |
| 2006/0149448 | A1* | 7/2006 | Tange | B60T 8/17557 701/41 |
| 2009/0048738 | A1* | 2/2009 | Iwazaki | B62D 1/28 701/44 |
| 2010/0138115 | A1* | 6/2010 | Kageyama | B60R 21/0134 701/46 |
| 2011/0264302 | A1* | 10/2011 | Tsunekawa | B60W 40/072 701/1 |
| 2012/0327233 | A1 | 12/2012 | Imai et al. | |
| 2013/0187772 | A1 | 7/2013 | Akiyama | |

FOREIGN PATENT DOCUMENTS

| | | |
|---|---|---|
| JP | 11-348696 A | 12/1999 |
| JP | 2003-337998 A | 11/2003 |
| JP | 2004-38487 A | 2/2004 |
| JP | 2004-268845 A | 9/2004 |
| JP | 2008-250904 A | 10/2008 |
| JP | 2010-76539 A | 4/2010 |
| JP | 2010-92416 A | 4/2010 |
| JP | 2011-118828 A | 6/2011 |
| JP | 2011-192227 A | 9/2011 |
| JP | 2012-79116 A | 4/2012 |

OTHER PUBLICATIONS

International Search Report dated Sep. 10, 2013 with English translation (ten (10) pages).

* cited by examiner

FIG.4
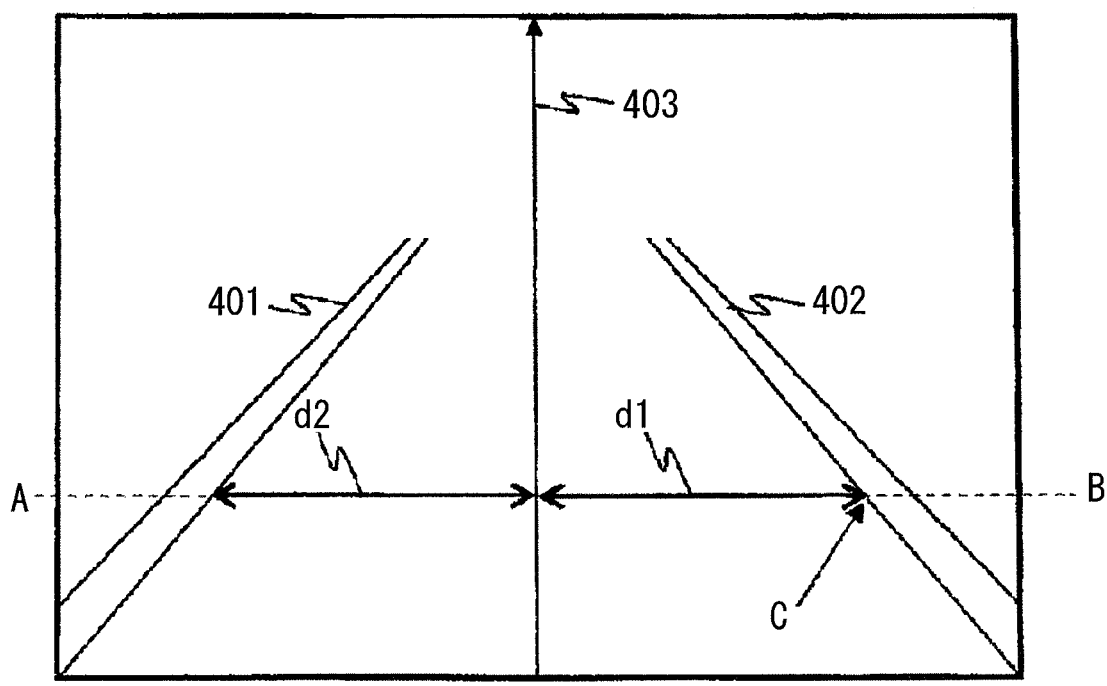
(a)
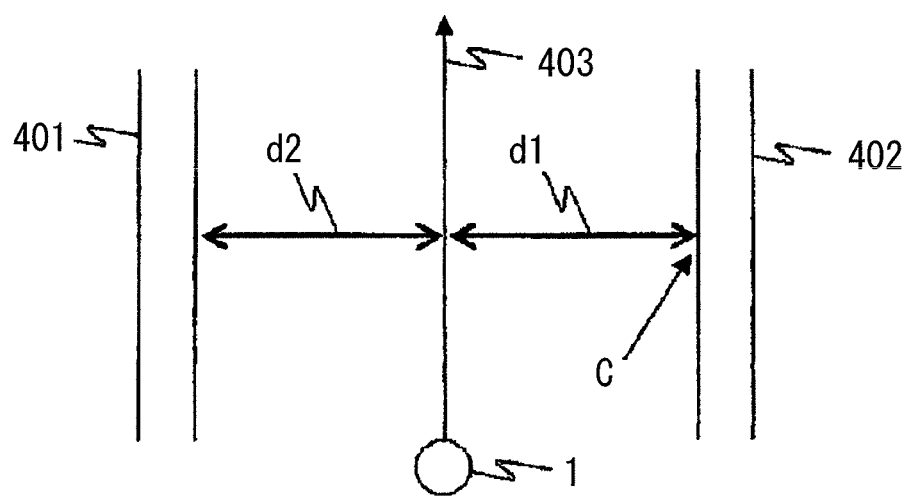
(b)

LANE DEPARTURE JUDGMENT APPARATUS, LANE DEPARTURE WARNING APPARATUS AND VEHICLE CONTROL SYSTEM USING THE SAME

TECHNICAL FIELD

The present invention relates to a lane departure judgment apparatus, a lane departure warning apparatus, and a vehicle control system using the aforementioned apparatuses.

BACKGROUND ART

With conventional techniques, a lane departure warning apparatus is known, which is configured to monitor a traffic lane by means of a vehicle-mounted camera, and to issue a warning when the vehicle departs from the traffic lane. For example, a lane departure warning apparatus is described in Patent document 1, which is configured to estimate the probability of departure of the user's vehicle from the driving lane by means of a lane monitoring camera that acquires an image of the road surface, and to instruct a warning unit to issue a warning when judgment is made that the probability of departure of the user's vehicle from the traffic lane becomes high.

CITATION LIST

Patent Literature

[Patent document 1] Japanese Laid-Open Patent Publication No. 2004-268845

SUMMARY OF INVENTION

Technical Problem

However, such a conventional technique has a problem in that, if the vehicle is in a situation in which it becomes susceptible to departure from a traffic lane, e.g., when the user drives the vehicle in a narrow lane, in many cases, such a departure warning is frequently issued. The present invention has been made in view of such a situation. Accordingly, it is a purpose of the present invention to provide a technique for making vehicle departure judgment with high precision even if the vehicle is in a situation in which it becomes susceptible to departure from a traffic lane.

Solution to Problem

According to the 1st aspect of the present invention, a lane departure judgment apparatus is configured to detect a lane-dividing line based on image information output from an image-capturing device that acquires an image of an area outside a vehicle, and to judge whether or not departure of the vehicle from the lane-dividing line occurs based on a distance between the vehicle and the lane-dividing line, wherein when an angle of the vehicle with respect to the lane-dividing line thus detected is constant, the distance between the vehicle and the lane-dividing line to be used to judge whether or not departure of the vehicle occurs is changed according to whether the vehicle is being driven on a road having a lane-dividing width that is greater than a predetermined width or on a road having a lane-dividing width that is smaller than a predetermined width.

According to the 2nd aspect of the present invention, in the lane departure judgment apparatus according to the 1st aspect, it is preferred that when the angle of the vehicle with respect to the lane-dividing line thus detected is constant and the vehicle departs from the lane-dividing line, time to judge vehicle departure is early when the vehicle is driven on a road having a lane-dividing width that is greater than a predetermined width as compared with a case in which the vehicle is being driven on a road having a lane-dividing width that is smaller than a predetermined width.

According to the 3rd aspect of the present invention, a lane departure judgment apparatus is configured to detect a lane-dividing line based on image information output from an image-capturing device that acquires an image of an area outside a vehicle, and to judge whether or not departure of the vehicle from the lane-dividing line occurs based on a distance between the vehicle and the lane-dividing line, wherein when an angle of the vehicle with respect to the lane-dividing line thus detected is constant, the distance between the vehicle and the lane-dividing line to be used to judge whether or not departure of the vehicle occurs is changed according to whether the vehicle is being driven on a road having a radius of curvature that is greater than a predetermined radius of curvature or on a road having a radius of curvature that is smaller than a predetermined radius of curvature.

According to the 4th aspect of the present invention, in the lane departure judgment apparatus according to the 3rd aspect, it is preferred that when the angle of the vehicle with respect to the lane-dividing line thus detected is constant and the vehicle departs from the lane-dividing line, time to judge vehicle departure is early when the vehicle is driven on a road having a radius of curvature that is greater than a predetermined radius of curvature as compared with a case in which the vehicle is being driven on a road having a radius of curvature that is smaller than a predetermined radius of curvature.

According to the 5th aspect of the present invention, a lane departure judgment apparatus comprises: a lane-dividing line detection unit that detects a lane-dividing line based on image information output from an image-capturing device that acquires an image of an area outside a vehicle; a distance calculation unit that calculates a distance between the lane-dividing line and an optical axis of the image-capturing device for each of predetermined periods; a yaw angle calculation unit that calculates a yaw angle of the vehicle with respect to the lane-dividing line; and a departure judgment unit that corrects the yaw angle calculated by the yaw angle calculation unit based on a road parameter which represents characteristics of a road on which the vehicle is being driven, and that judges departure of the vehicle from the lane-dividing line based on the corrected yaw angle and the distance between the lane-dividing line and the optical axis calculated by the distance calculation unit.

According to the 6th aspect of the present invention, in the lane departure judgment apparatus according to the 5th aspect, it is preferred that the departure judgment unit corrects the yaw angle based on at least one from among a lane width of the road and a radius of curvature of the road, which are each configured as the road parameter.

According to the 7th aspect of the present invention, in the lane departure judgment apparatus according to the 5th or 6th aspect, it is preferred that the lane departure judgment apparatus further comprises a fluctuation calculation unit that calculates, in a time-series manner, variance of the distance between the lane-dividing line and the optical axis calculated by the distance calculation unit, and the departure judgment unit corrects the yaw angle calculated by the yaw angle calculation unit based on the road parameter and the variance calculated by the fluctuation calculation unit, and judges the departure of the vehicle based on the corrected yaw angle and the distance between the lane-dividing line and the optical axis calculated by the distance calculation unit.

According to the 8th aspect of the present invention, a lane departure warning apparatus comprises: a lane departure judgment apparatus according to any one of the 1st through 7th aspects; and a warning output unit that outputs a warning signal which indicates lane departure based on a departure judgment result obtained by the departure judgment apparatus.

According to the 9th aspect of the present invention, a vehicle control system comprises: a lane departure warning apparatus according to the 8th aspect; and a warning issuing unit that issues a warning based on an output result of a warning signal output from the lane departure warning apparatus.

Advantageous Effect of the Invention

With the present invention, departure judgment can be made with high precision even if the vehicle is in a situation in which it is susceptible to departure from the lane.

BRIEF DESCRIPTION OF THE DRAWINGS

FIG. 4 is a diagram showing the image data (a) acquired by the image-capturing device 1 and a plan view (b) showing a vehicle and a road as viewed from above at the time point at which the image data is acquired.

DESCRIPTION OF EMBODIMENTS

Detailed description will be made below regarding an embodiment of the present invention with reference to the drawings.

First embodiment

Figure 1:
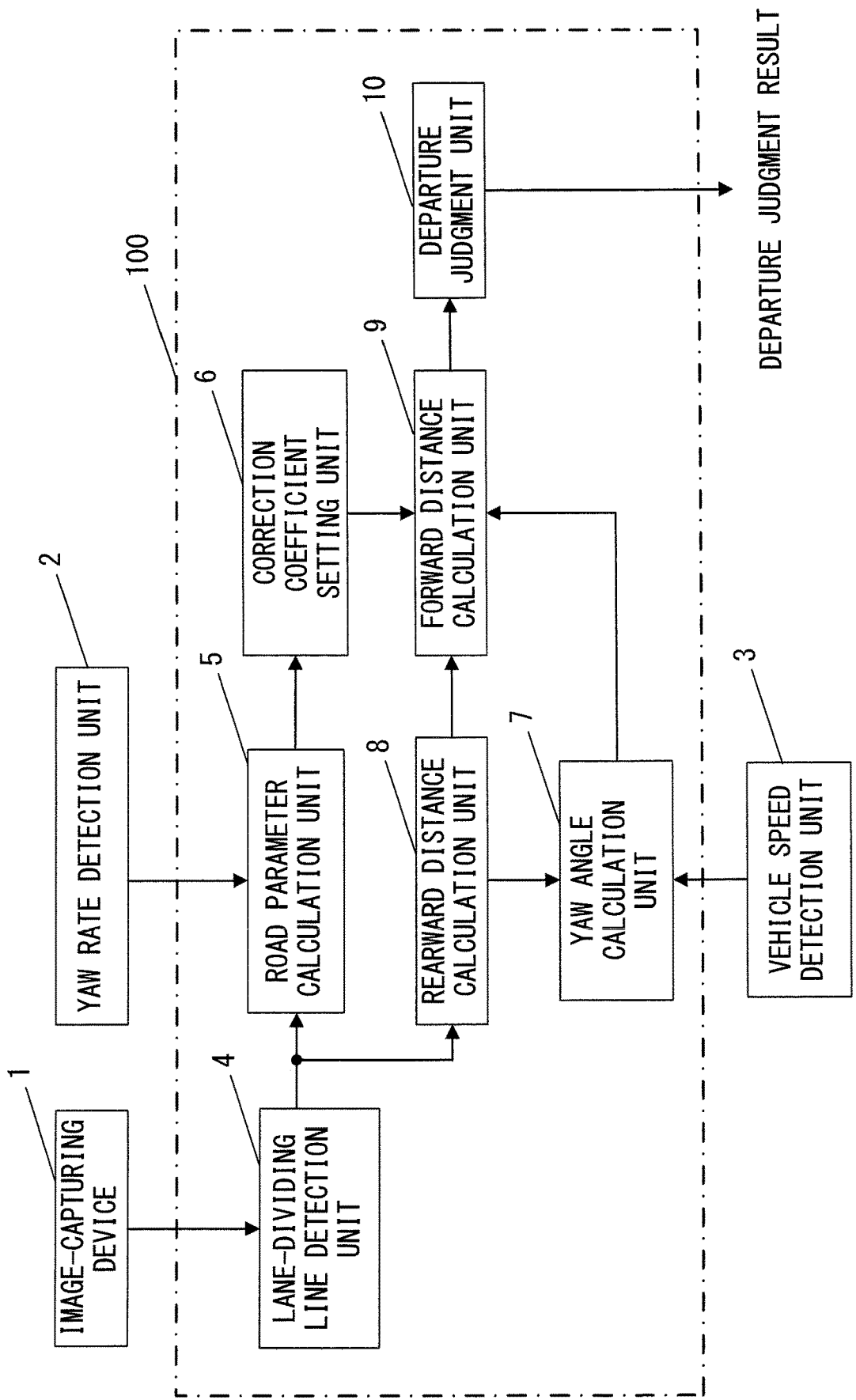
FIG. 1 is a block diagram showing a configuration of a lane departure judgment apparatus 100 according to a first embodiment.

FIG. 1 is a block diagram showing a configuration of a lane departure judgment apparatus 100 according to a first embodiment. The lane departure judgment apparatus 100 includes a lane-dividing line detection unit 4, a road parameter calculation unit 5, a correction coefficient setting unit 6, a yaw angle calculation unit 7, a rearward distance calculation unit 8, a forward distance calculation unit 9, and a departure judgment unit 10. The lane departure judgment apparatus 100 instructs an unshown computer to execute a predetermined control program, so as to provide each of these units with a corresponding function.

The lane departure judgment apparatus 100 is connected to an image-capturing device 1, a yaw rate detection unit 2, and a vehicle speed detection unit 3. The lane departure judgment apparatus 100 is configured to judge whether or not there is a risk of departure of the vehicle from the lane in which it is driven based on the image data input from the image-capturing device 1, the yaw rate input from the yaw rate detection unit 2, and the vehicle speed input from the vehicle speed detection unit 3, and to externally output the judgment result. That is to say, the vehicle lane departure judgment apparatus 100 detects a lane line which corresponds to a lane-dividing line based on the image information output from the image-capturing device that acquires an image of the outside of the vehicle. Furthermore, the vehicle lane departure judgment apparatus 100 judges whether or not departure of the vehicle from the lane-dividing line occurs based on the distance between the vehicle and the lane-dividing line.

With the present invention, in a state in which the angle of the vehicle with respect to the lane-dividing line thus detected is constant, the distance between the vehicle and the lane-dividing line used to judge whether or not departure of vehicle from the lane-dividing line occurs is changed according to whether the lane in which the vehicle is driven has a wider lane-dividing-lines width (lane width) or a narrower lane-dividing-lines width (lane width) than a predetermined width. Furthermore, in a state in which the angle of the vehicle with respect to the lane-dividing line thus detected is constant, when the vehicle is driven in a lane having a wider lane-dividing-lines width than a predetermined width, the detection time to judge whether or not departure of the vehicle from the lane occurs is early as compared with a case in which the vehicle is driven in a lane having a narrower lane-dividing-lines width than the predetermined width. Similarly, in a state in which the angle of the vehicle with respect to the lane-dividing line thus detected is constant, the distance between the vehicle and the lane-dividing line used to judge whether or not departure of the vehicle from the lane occurs is changed according to whether the road in which the vehicle is driven has a larger radius of curvature or a smaller radius of curvature than a predetermined radius of curvature. Furthermore, in a state in which the angle of the vehicle with respect to the lane-dividing line thus detected is constant, when the vehicle is driven in a road having a larger radius of curvature than a predetermined radius of curvature, the detection time to judge whether or not departure of the vehicle from the lane-dividing lines occurs is early as compared with a case in which the vehicle is driven in a road having a smaller radius of curvature than the predetermined radius of curvature.

The vehicle-mounted image-capturing device 1 acquires an image of the outside of the vehicle by means of an image-capturing element such as a CCD (Charge Coupled Device) image sensor, CMOS (Complementary Metal Oxide Semiconductor) imaging sensor, or the like. The image-capturing device 1 outputs, to the lane departure judgment apparatus 100 (a lane-dividing line detection unit 4 thereof), via a dedicated line or the like, the data thus acquired as it is, i.e., in the form of analog image data or otherwise in the form of computer-processable image data after it is subjected to digital processing. The image-capturing device 1 is arranged on the rear side of the vehicle such that image-capturing range covers the surface of the road behind the vehicle.

The yaw rate detection unit 2 detects the yaw rate (turning speed in the turning direction) of the vehicle based on the output of a gyroscope or the like, for example.

The vehicle speed detection unit 3 detects the driving speed of the vehicle by averaging the values obtained by wheel speed sensors respectively mounted on the left-front wheel, right-front wheel, left-rear wheel, and right-rear wheel, or by integrating the measurement value of acceleration of the vehicle obtained by an acceleration sensor mounted on the vehicle.

The lane-dividing line detection unit 4 analyzes the image data (image information) generated based on the image of the outside of the vehicle acquired by the image-capturing device 1, so as to detect, for every predetermined period, the lane-dividing line (e.g., a pair of left and right lines, an outside line of the vehicle lane, etc.) painted on the surface of the road.

The road parameter calculation unit 5 calculates road parameters which represent the characteristics of the road on which the vehicle is driven, examples of which include the lane width and the radius of curvature of the road. The lane width is calculated based on the positions of lane-dividing lines detected by the lane-dividing line detection unit 4. Furthermore, the radius of curvature of the road on which the vehicle is driven is calculated based on the yaw rate detected by the yaw rate detection unit 2.

The correction coefficient setting unit 6 sets a correction coefficient described later based on the road parameters calculated by the road parameter calculation unit 5.

The yaw angle calculation unit 7 calculates the yaw angle of the vehicle with respect to the lane-dividing line based on the position of the lane-dividing line detected by the lane-dividing line detection unit 4, the vehicle speed detected by the vehicle speed detection unit 3, and the like.

The rearward distance calculation unit 8 calculates the distance between the lane-dividing line detected by the lane-dividing line detection unit 4 and the optical axis of the image-capturing device 1 (distance from the optical axis to the lane-dividing line) at a predetermined position rearward of the vehicle.

The forward distance calculation unit 9 calculates the distance between the lane-dividing line detected by the lane-dividing line detection unit 4 and the front wheel of the vehicle (distance from the front wheel of the vehicle to the lane-dividing line).

The departure judgment unit 10 judges whether or not there is a risk of departure of the vehicle from the lane based on the distance between the front wheel and the lane-dividing line detected by the forward distance calculation unit 9. It should be noted that the lane departure judgment result thus obtained is to be used to issue a vehicle departure warning that conforms to a JIS standard (JIS D 0804). That is to say, the departure judgment unit 10 judges whether or not there is a risk of vehicle departure from the lane based on the yaw angle of the vehicle calculated by the yaw angle calculation unit 7 and the distance between the lane-dividing line and the front wheel of the vehicle calculated by the forward distance calculation unit 9.

In the JIS standard, it is specified that judgment is made whether or not a vehicle departure warning should be issued based on the distance between the outer side of the front wheel of the vehicle and the lane-dividing line. On the other hand, the image-capturing device 1 is arranged so as to acquire an image behind the vehicle. The forward distance calculation unit 9 according to the present embodiment corrects the distance between its optical axis and the lane-dividing line at the rearward of the vehicle calculated by the rearward distance calculation unit 8 such that it is converted into the distance between the outer side of the front wheel of the vehicle and the lane-dividing line based on the yaw angle of the vehicle calculated by the yaw angle calculation unit 7 in order to meet the above JIS standard.

Next, description will be made regarding the overall operation of the lane departure judgment apparatus 100.

Figure 2:
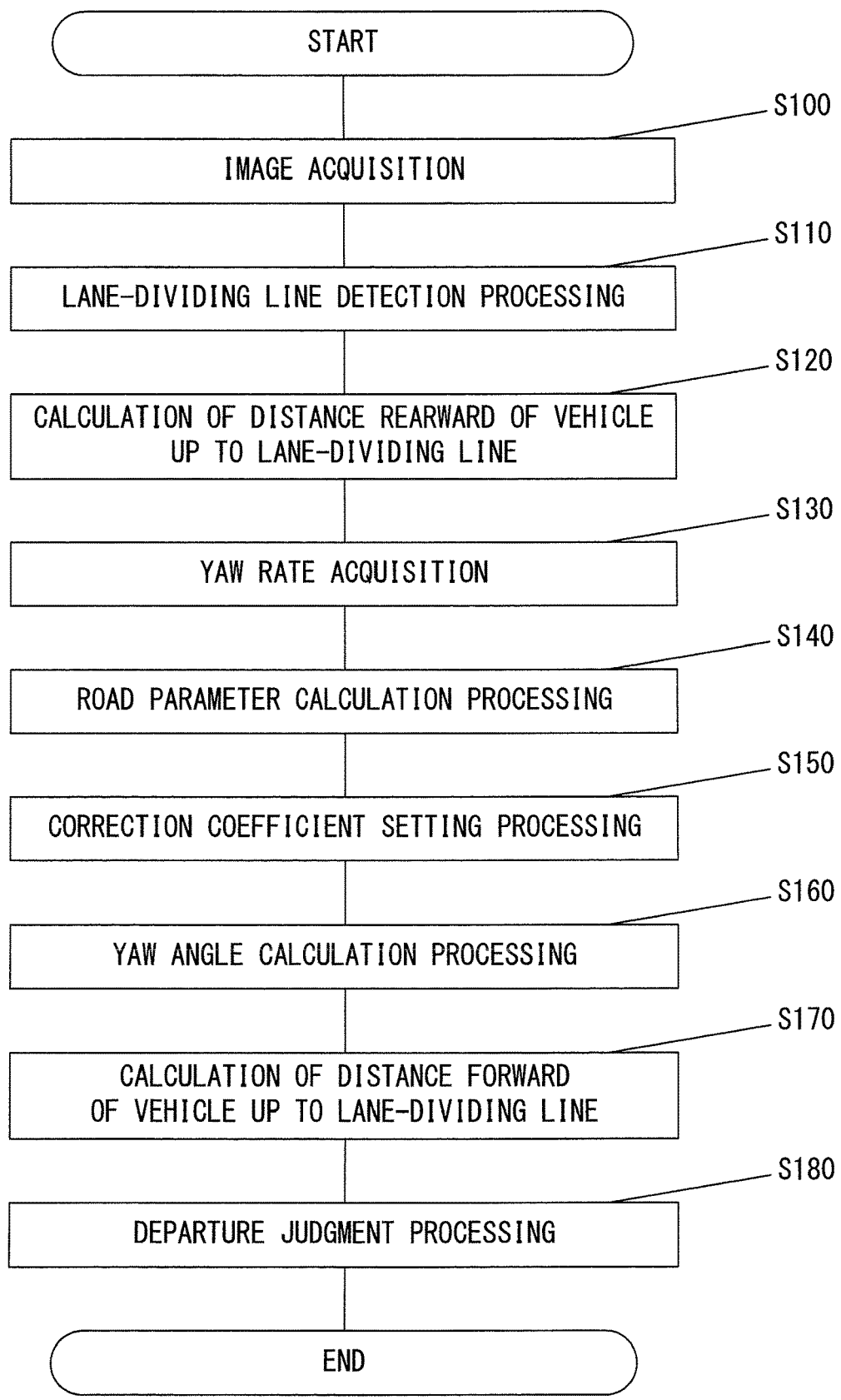
FIG. 2 is a flowchart showing the operation of the lane departure judgment apparatus 100.

FIG. 2 is a flowchart showing the operation of the lane departure judgment apparatus 100. The operation shown in FIG. 2 is repeatedly executed for every predetermined period.

First, in Step S100, the lane-dividing line detection unit 4 acquires the image data acquired by the image-capturing device 2 after it is subjected to digital processing.

Next, in Step S110, the lane-dividing line detection unit 4 detects the lane-dividing line painted on the surface of the road based on the image data acquired in Step S100. Description will be made below with reference to a specific example regarding the detection of the lane-dividing line performed in Step S110.

Figure 3:
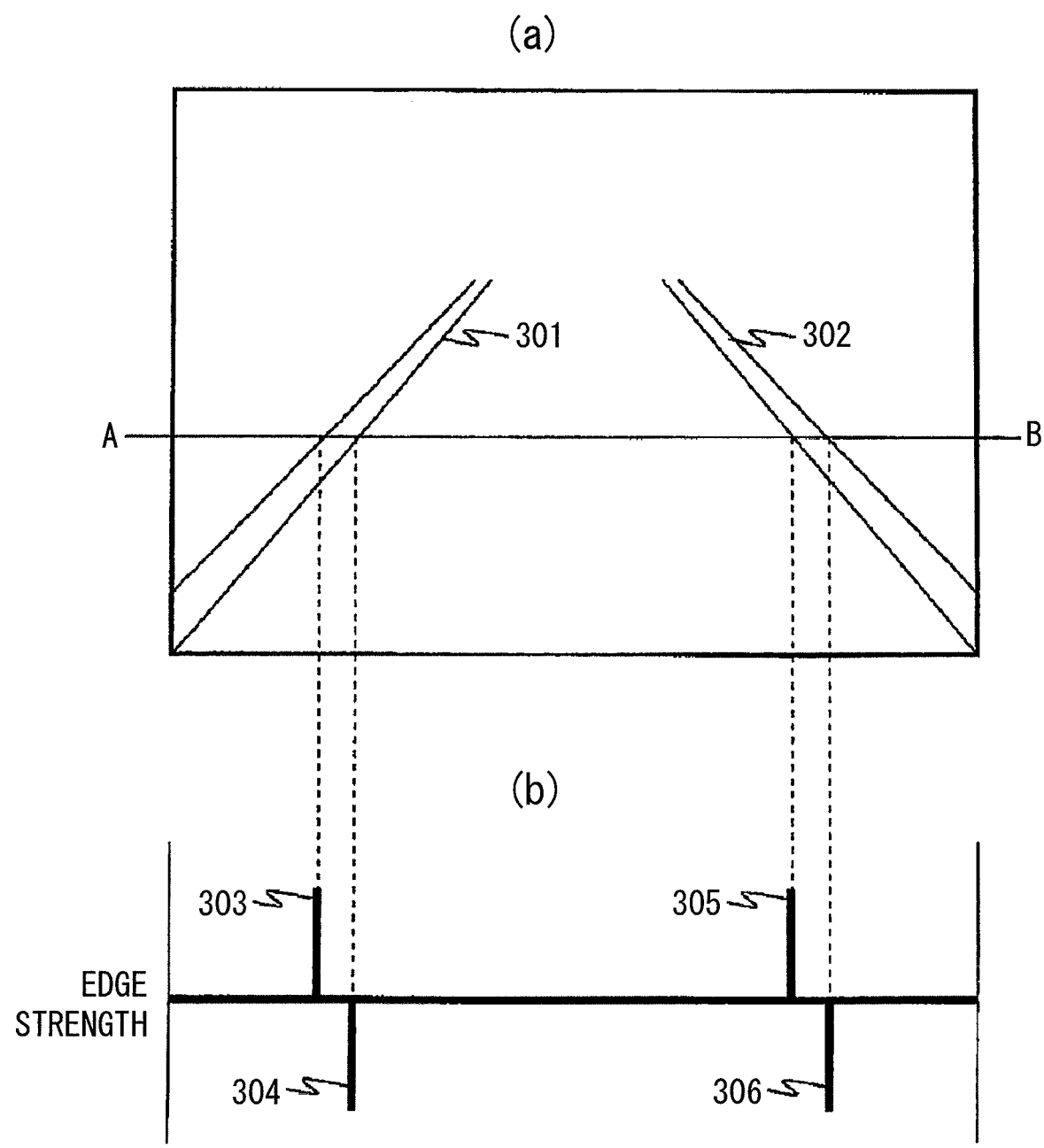
FIG. 3 is a diagram showing the image data acquired by an image-capturing device 1 and the edge strength detected by a lane-dividing detection unit 4.

FIG. 3 is a diagram showing the image data acquired by the image-capturing device 1 and the edge strength detected by the lane-dividing line detection unit 4. Let us consider a case in which, as shown in FIG. 3(*a*), the image-capturing device 1 acquires the image data including two lane-dividing lines 301 and 302. As a method for detecting such lane-dividing lines, the lane-dividing line detection unit 4 according to the present embodiment calculates the edge strength in the image so as to extract the lane-dividing lines. Here, an "edge" represents a point at which the luminance value suddenly changes in the image.

FIG. 3(*b*) shows the detection result obtained by detecting the edge strength along a line from the point A to the point B in FIG. 3(*a*). The point A and the point B are determined beforehand within the image-capturing range. The lane-dividing line detection unit 4 detects the edge strength along the straight line that connects the point A and the point B so as to detect each lane-dividing line. FIG. 3(*b*) shows the edge detection result showing peaks 303 and 305, each of which is configured as a point of change from a road to a lane-dividing line (i.e., a point at which the luminance suddenly changes from dark to bright), and peaks 304 and 306, each of which is configured as a point of change from a lane dividing-line to a road (i.e., a point at which the luminance suddenly changes from bright to dark). The lane-dividing line detection unit 4 detects a combination of the peaks 303 and 304 and a combination of the peaks 305 and 306 shown in FIG. 3(*b*), thereby detecting the lane-dividing lines 301 and 302 that correspond to the respective combinations.

Description will be made returning to the flowchart shown in FIG. 2. In Step S120, the rearward distance calculation unit 8 calculates the distance between the optical axis of the image-capturing device 1 and the lane-dividing line detected in Step S110. Description will be made below with reference to a specific example regarding the calculation of the distance performed in Step S120.

FIG. 4 shows image data (a) acquired by the image-capturing device 1 and a plan view (b) showing the vehicle and the road as viewed from above when the image data is acquired. FIG. 4 shows a view of driving in a road having a right lane-dividing line 401 and a left lane-dividing line 402. The arrow 403 represents the optical axis of the image-capturing device 1. It should be noted that the image-capturing device 1 is arranged on the rear side of the vehicle. Accordingly, the lane-dividing line 401 shown on the left side in FIG. 4 represents the right lane-dividing line that is positioned on the right side with respect to the vehicle driving direction. On the other hand, the lane-dividing line 402 shown on the right side in FIG. 4 represents the left lane-dividing line that is positioned on the left side with respect to the vehicle driving direction.

In FIG. 4(a), the distance d1 (which will be referred to as the "left rearward distance d1" hereafter) between the optical axis 403 and the left lane-dividing line 402 can be calculated based on the position of the left lane-dividing line 402 detected by the lane-dividing line detection unit 4. The rearward distance calculation unit 8 calculates the coordinate point C, which is configured as a point at which the straight line that connects the point A and the point B crosses the edge that corresponds to the inner side of the left lane-dividing line 402, by detecting the peak of the edge strength detected by the lane-dividing line detection unit 4. The coordinate point thus calculated is converted into the actual coordinate system shown in FIG. 4(b), thereby calculating the left rearward distance d1. Furthermore, the lane-dividing line detection unit 4 calculates the distance d2 (which will be referred to as the "right rearward distance d2" hereafter) between the optical axis 403 and the lane-dividing line 401 by performing similar calculation.

Description has been made above assuming that the left rearward distance d1 represents the distance between the optical axis 403 and the inner side of the left lane-dividing line 402. That is to say, the left rearward distance d1 is calculated based on the coordinate point C on the edge that corresponds to the inner side of the left lane-dividing line 402. Also, the left rearward distance d1 may represent the distance between the optical axis 403 and the outer side of, or otherwise the center of, the left lane-dividing line 402. Such a definition may be made as desired so long as it is consistent throughout the description. Also, an arrangement may be made configured to calculate the distance (each of the left rearward distance d1 and the right rearward distance d2) between the optical axis 403 and the corresponding lane-dividing line at multiple positions (e.g., 10 positions), instead of an arrangement in which the rearward distance is calculated at a single position for each of the lane-dividing lines (left lane-dividing line 402 and right lane-dividing line 401) in the image. For example, like the combination of the point A and the point B, a combination of points may be determined at multiple positions within the image-capturing range, and edge detection may be performed for each combination thus determined, thereby calculating the distance between the optical axis 403 and the edge.

Next, in Step S130, the road parameter calculation unit 5 acquires the yaw rate of the vehicle detected by the yaw rate detection unit 2. The yaw rate of the vehicle is configured as a turning speed of the vehicle in the turning direction as described above, which can be detected using a gyroscope or the like according to a known technique, for example.

Next, in Step S140, the road parameter calculation unit 5 calculates the road parameters of the road on which the vehicle is being driven based on the lane-dividing lines detected by the lane-dividing line detection unit 4 and the yaw rate of the vehicle detected by the yaw rate detection unit 2. In the present embodiment, the road parameters are configured as two parameters, i.e., the lane width and the radius of curvature of the lane.

For example, in FIG. 3, the road parameter calculation unit 5 calculates, as the lane width, the distance between the peaks 304 and 305 (i.e., the distance between the two lane-dividing lines detected by the lane-dividing line detection unit 4). Specifically, the same calculation method is used as that described above in Step S120.

Furthermore, the road parameter calculation unit 5 according to the present embodiment calculates the radius of curvature of the road based on the yaw rate input from the yaw rate detection unit 2. Specifically, assuming that the yaw rate represented by N (degrees/second) corresponds to the radius of curvature represented by M (meters) (M and N each represent a given value), the road parameter calculation unit 5 multiples the yaw rate thus detected by M/N, thereby calculating the radius of curvature. It should be noted that, when the driver turns the steering wheel, a certain value is detected as the yaw rate even if the vehicle is being driven in a straight lane for example. Even in such a case, the calculation result may be regarded as the radius of curvature of the road.

Next, in Step S150, the correction coefficient setting unit 6 sets the correction coefficients based on the road parameters calculated by the road parameter calculation unit 5. Detailed description will be made later regarding the definition of the correction coefficients and the setting method for setting the correction coefficients performed by the correction coefficient setting unit 6.

Next, in Step S160, the yaw angle calculation unit 7 calculates the yaw angle of the vehicle based on the left rearward distance d1 and the right rearward distance d2 each calculated by the rearward distance calculation unit 8 and the vehicle speed detected by the vehicle speed detection unit 3. For example, the yaw angle calculation unit 7 calculates the yaw angle of the vehicle based on the left rearward distance d1 calculated at the time point t1, the left rearward distance d1 calculated at the time point t2, and the distance traveled by the vehicle between the time point t1 and the time point t2. Here, the time point t2 is the last time point at which the left rearward distance d1 has been calculated. The time point t1 is a time point before the time point t2. The distance traveled by the vehicle from the time point t1 to the time point t2 is calculated based on the vehicle driving speed detected by the vehicle speed detection unit 3.

It should be noted that two or more previously obtained calculation results of the left rearward distance d1 may be used to calculate the yaw angle, thereby providing the yaw angle of the vehicle with higher precision. Specifically, a regression line is calculated based on multiple calculation results of the left rearward distance d1 by means of a least-squares method. The yaw angle of the vehicle may be calculated based on the regression line thus obtained and the distance traveled by the vehicle. The method for calculating the yaw angle of the vehicle is not restricted to such an arrangement. Rather, a desired method can be employed.

Next, in Step S170, the forward distance calculation unit 9 calculates the distance between the front wheel of the vehicle and the lane-dividing line based on the left rearward distance d1, the right rearward distance d2, and the vehicle yaw angle θ. Description will be made below with reference to a specific example regarding the calculation of the distance between the front wheel of the vehicle and the lane-dividing line performed in Step S170.

Figure 5:
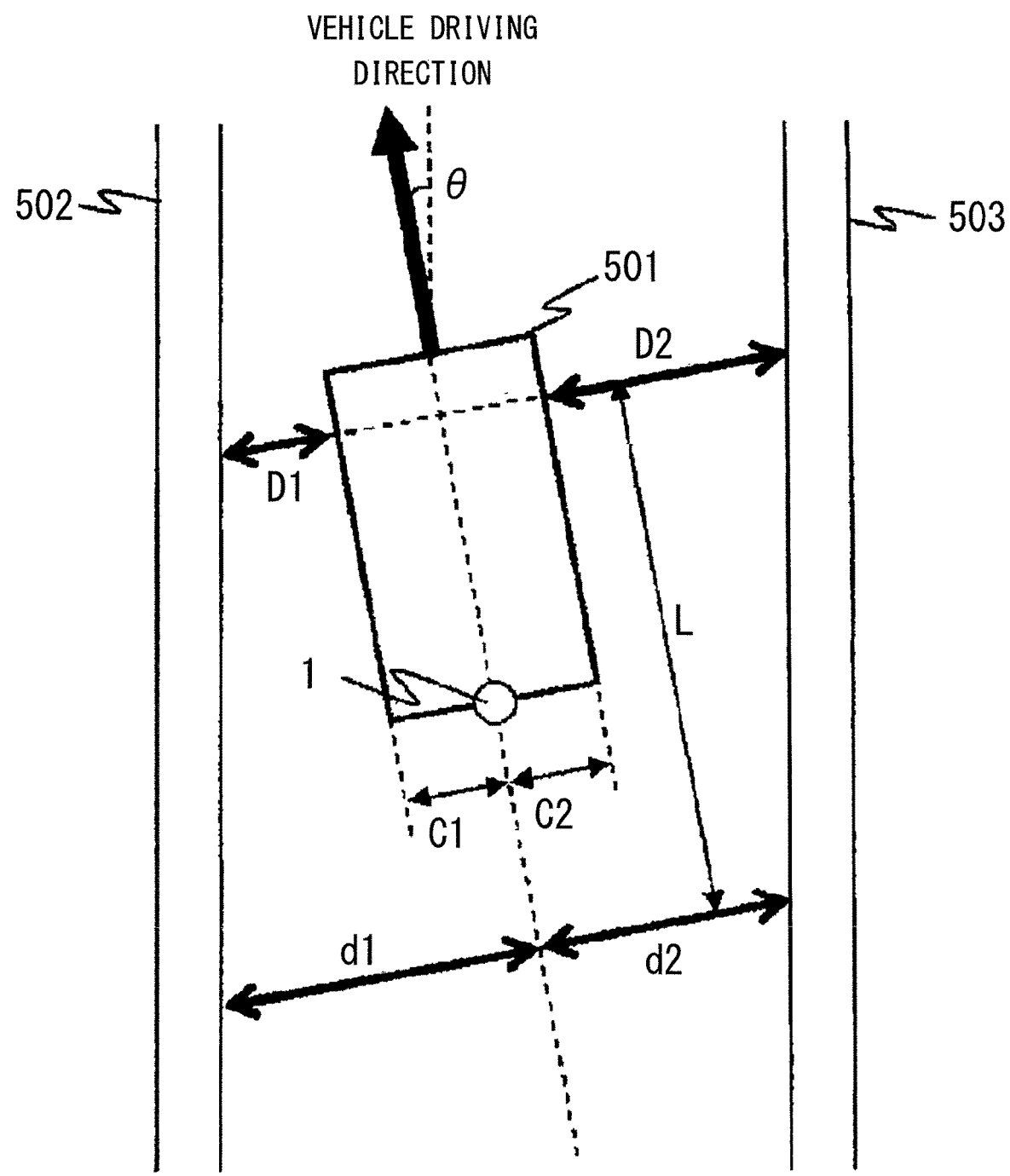
FIG. 5 is a schematic plan view showing a vehicle 501 which is being driven on a road having two lane-dividing lines 502 and 503.

FIG. 5 is a schematic plan view showing a vehicle 501 which is being driven in a road having two lane-dividing lines 502 and 503. In FIG. 5, the yaw angle θ has already been calculated by the yaw angle calculation unit 7, and accordingly, the yaw angle θ is a known value. Furthermore, the left rearward distance d1 and the right rearward distance d2 have already been calculated by the rearward distance calculation unit 8, and accordingly, the left rearward distance d1 and the right rearward distance d2 are each a known value. Moreover, the lane departure judgment apparatus 100 inputs in advance the distance C1 between the image-capturing device 1 and the outer side of the left front wheel of the vehicle, the distance C2 between the image-capturing device 1 and the outer side of the right front wheel of the vehicle, and the distance L between the point (on the straight line that connects the points A and B in FIG. 4) at which the left rearward distance d1 is calculated and the front wheel of the vehicle.

The forward distance calculation unit 9 calculates the distance D1 (which will be referred to as the "left forward distance D1" hereafter) between the outer side of the vehicle left front wheel and the left lane-dividing line based on the following Expression (1) using the left rearward distance d1, the distance L between the point at which the left rearward distance d1 is calculated and the vehicle front wheel, the distance C1 between the image-capturing device 1 and the outer side of the left front wheel of the vehicle, and the vehicle yaw angle θ.

$$D1 = d1 - L \times \tan(\alpha\theta) - C1 \quad (1)$$

Here, α represents the correction coefficient set by the correction coefficient setting unit 6. The correction coefficient setting unit 6 sets the correction coefficient α to a value which is equal to or greater than 0 and is equal to or smaller than 1. In a case in which the correction coefficient α is set to 1, the left forward distance D1 calculated using the aforementioned Expression (1) matches the geometric distance D1 indicated by the arrow in FIG. 5. In a case in which the correction coefficient α is set to zero, the actual vehicle yaw angle θ is ignored. In this case, the left forward distance D1 is calculated assuming that the direction of the vehicle matches the direction of the road. That is to say, in the calculation of the left forward distance D1, the correction coefficient α set by the correction coefficient setting unit 6 is used to correct the vehicle yaw angle θ such that it functions as a smaller yaw angle than the actual yaw angle.

In the same way as described above, the forward distance calculation unit 9 calculates the distance D2 (which will be referred to as the "right forward distance D2" hereafter) between the outer side of the right front wheel of the vehicle and the right lane-dividing line based on the following Expression (2).

$$D2 = d2 + L \times \tan(\alpha\theta) - C2 \quad (2)$$

Returning to description of the flowchart shown in FIG. 2, in the next step, i.e., Step S180, the departure judgment unit 10 judges whether or not there is a risk of departure of the vehicle from the lane based on the left forward distance D1 and the right forward distance D2 calculated in Step S170. Specifically, when either one of the left forward distance D1 and the right forward distance D2 becomes equal to or smaller than a predetermined distance, the departure judgment unit 10 judges that there is a risk of vehicle departure from the lane.

By performing the aforementioned operation, the lane departure judgment apparatus 100 outputs a judgment result obtained by judging whether or not there is a risk of departure of the vehicle from the lane. By employing the lane departure judgment apparatus 100, such an arrangement provides a lane departure warning apparatus that conforms to the JIS standard (JIS D 0804). Specifically, when the left forward distance D1 or the right forward distance D2 enters a predetermined range (e.g., becomes equal to or smaller than 5 cm), such a lane departure warning (alarm) apparatus issues a warning (alarm) in the form of an audio warning output from a speaker, in the form of a message displayed on a display, or the like. It should be noted that such a warning may preferably be cleared after a predetermined time (e.g., 2 seconds) elapses after the warning is issued.

Next, description will be made regarding a setting method for setting the correction coefficient performed by the correction coefficient setting unit 6.

In a case in which the left forward distance D1 and the right forward distance D2 are calculated based on the Expressions (1) and (2) having no correction coefficient α, in some cases, judgment is frequently made that there is a risk of departure of the vehicle from the lane, depending on the characteristics of the road in which the vehicle is being driven. For example, when the vehicle is driven in a lane having a small width, there is a small margin between the vehicle and each lane-dividing line. This leads to frequent changes of the departure judgment result due to changes in the vehicle yaw angle θ. When the vehicle is driven in a road having a small radius of curvature (when the vehicle is driven in a tightly-curved lane), there is also a small margin between the vehicle and each lane-dividing line. This leads to the same result. In order to suppress such frequent change in the departure judgment result, the correction coefficient α is used to correct the vehicle yaw angle θ such that it functions as a smaller vehicle yaw angle than the actual yaw angle in the calculation of the left forward distance D1 and the right forward distance D2.

First, the correction coefficient setting unit 6 according to the present embodiment calculates the correction coefficients α1 and α2 for the two respective road parameters, i.e., the lane width and the radius of curvature. Subsequently, the correction coefficient setting unit 6 calculates the arithmetic average of the multiple correction coefficients α1 and α2 so as to provide the final correction coefficient α.

Figure 6:
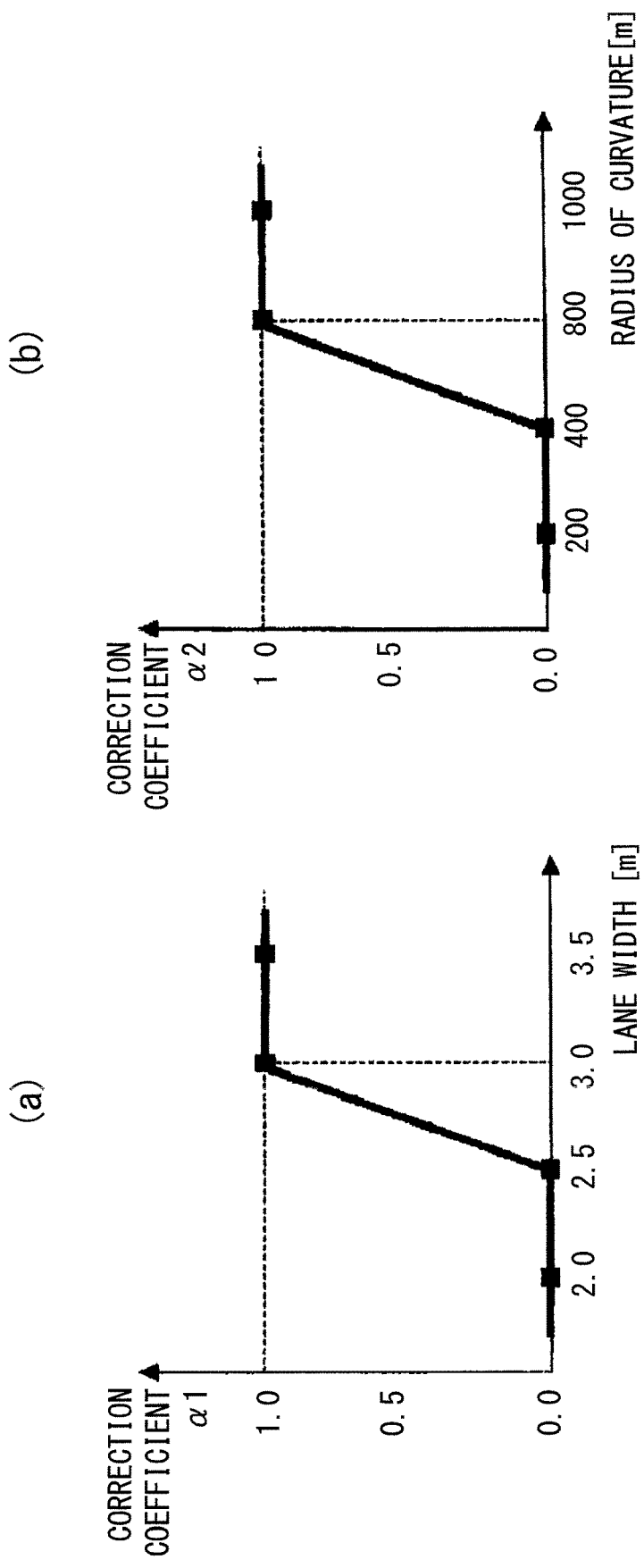
FIG. 6 is graphs showing the correlation between the road parameters and the correction coefficients α1 and α2.

FIG. 6 shows an example of graphs showing the correlations between the road parameters and the correction coefficients α1 and α2, respectively.

As shown in FIG. 6(a), when the lane has a lane width that is smaller than 2.5 m, the correction coefficient setting unit 6 sets the correction coefficient α1 to 0. When the lane has a lane width that is greater than 3 m, the correction coefficient setting unit 6 sets the correction coefficient α1 to 1. When the lane has a lane width that is equal to or greater than 2.5 m and equal to or smaller than 3 m, the correction coefficient setting unit 6 sets the correction coefficient α1 using a linear function configured to provide a value ranging between 0 and 1.

Furthermore, as shown in FIG. 6(b), when the road has a radius of curvature that is smaller than 400 m, the correction coefficient setting unit 6 sets the correction coefficient α2 to 0. When the road has a radius of curvature that is greater than 800 m, the correction coefficient setting unit 6 sets the correction coefficient α2 to 1. When the road has a radius of curvature that is equal to or greater than 400 m and equal to or smaller than 800 m, the correction coefficient setting unit 6 sets the correction coefficient α2 using a linear function configured to provide a value ranging between 0 and 1.

The lane departure judgment apparatus according to the first embodiment described above provides the following operations and advantageous effects.

(1) The lane-dividing line detection unit 4 detects the lane-dividing line based on the image information output from the image-capturing device 1 that acquires an image of the outside of the vehicle. The rearward distance calculation unit 8 calculates the distance between the lane-dividing line and the optical axis 403 of the image-capturing device 1 for every predetermined period. The yaw angle calculation unit 7 calculates the yaw angle of the vehicle with respect to the lane-dividing line based on the distance calculated by the rearward distance calculation unit 8 and the vehicle traveling distance which is the distance traveled by the vehicle in a predetermined period. The correction coefficient setting unit 6 sets the correction coefficient based on the road parameters, which represent the characteristics of the road on which the vehicle is being driven, and which are calculated by the road parameter calculation unit 5. The forward distance calculation unit 9 corrects the yaw angle calculated by the yaw angle calculation unit 7 using the correction coefficient. Furthermore, the forward distance calculation unit 9 calculates the distance between the front wheel of the vehicle and the lane-dividing line based on the corrected yaw angle and the distance between the lane-dividing line and the optical axis 403 calculated by the rearward distance calculation unit 8. The departure judgment unit 10 makes the vehicle departure judgment with respect to the lane-dividing line based on the distance between the front wheel of the vehicle and the lane-dividing line calculated by the forward distance calculation unit 9. Such an arrangement is capable of making high-precision departure judgment even if the vehicle is in a situation in which it becomes susceptible to departure from the lane.

(2) The departure judgment unit 10 makes the departure judgment based on the lane width of the road and the radius of curvature of the road, each of which are configured as a road parameter. Thus, such an arrangement provides high-precision departure judgment according to the characteristics of the road.

Second embodiment

Figure 7:
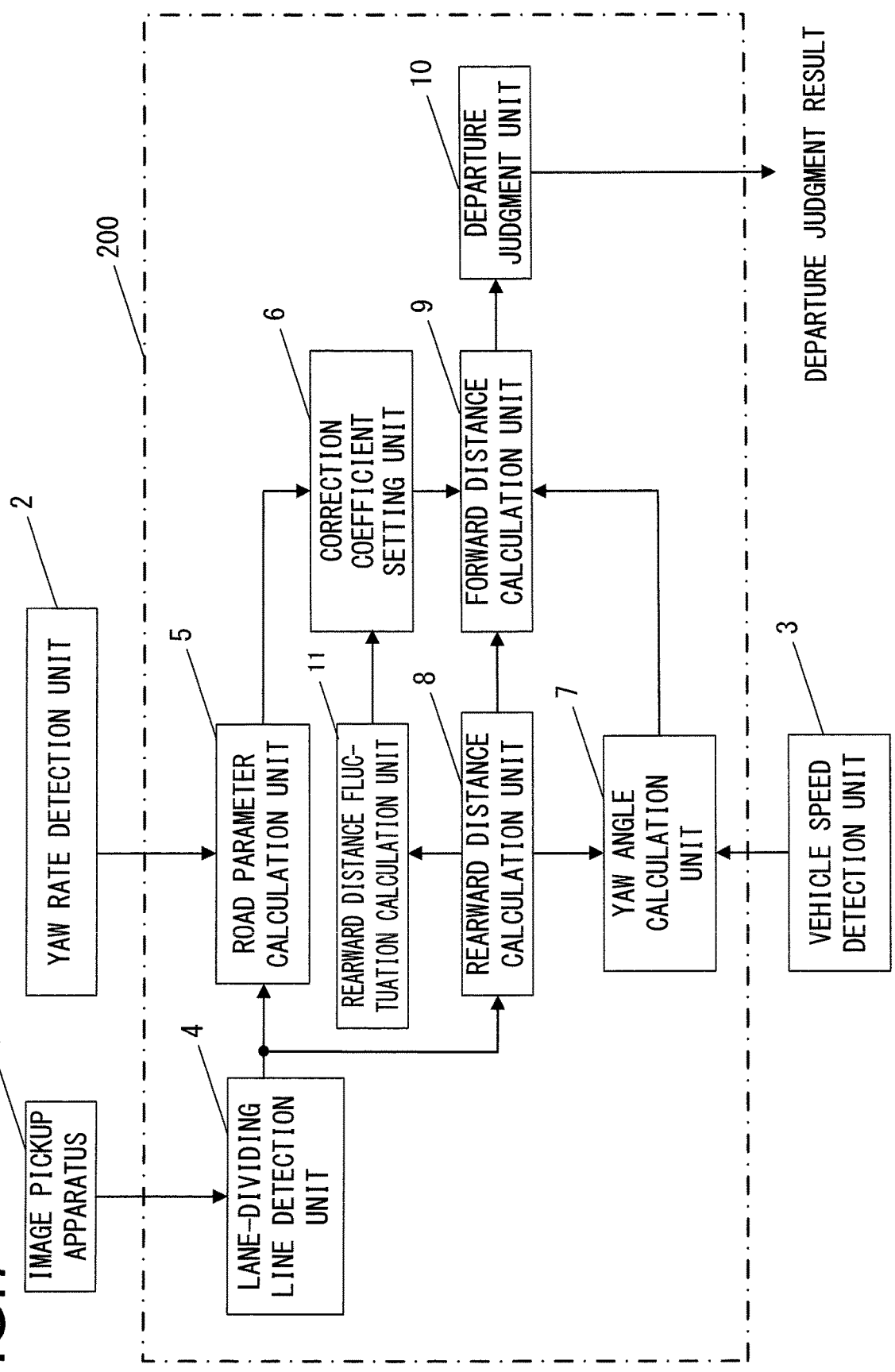
FIG. 7 is a block diagram showing a configuration of a lane departure judgment apparatus 200 according to a second embodiment.

FIG. 7 is a block diagram showing a configuration of a lane departure judgment unit 200 according to a second embodiment. The lane departure judgment apparatus 200 further includes a rearward distance fluctuation calculation unit 11, in addition to the components that form the lane departure judgment apparatus 100 according to the first embodiment.

The rearward distance fluctuation calculation unit 11 calculates the fluctuation (rearward distance fluctuation) that occurs in a time-series manner in the left rearward distance d1 and the right rearward distance d2, each of which is calculated by the rearward distance calculation unit 8. The correction coefficient setting unit 6 calculates a correction coefficient α3 that corresponds to the fluctuation value, and sets the correction coefficient α based on the three correction coefficients, i.e., the correction coefficient α3 thus calculated and the correction coefficients α1 and α2 described in the first embodiment.

A large rearward distance fluctuation value means that there is large variance in the position of the lane-dividing line detected by the lane-dividing line detection unit 4. In other words, there is large variance in the detection result obtained by the lane-dividing line detection unit 4, which means that the lane-dividing line detection unit 4 detects the lane-dividing line in an unstable state (with low precision). The correction coefficient setting unit 6 lowers the correction coefficient α3 according to an increase in the rearward distance fluctuation value, i.e., according to an increase in the instability level of the lane-dividing line detection operation of the lane-dividing line detection unit 4.

Figure 8:
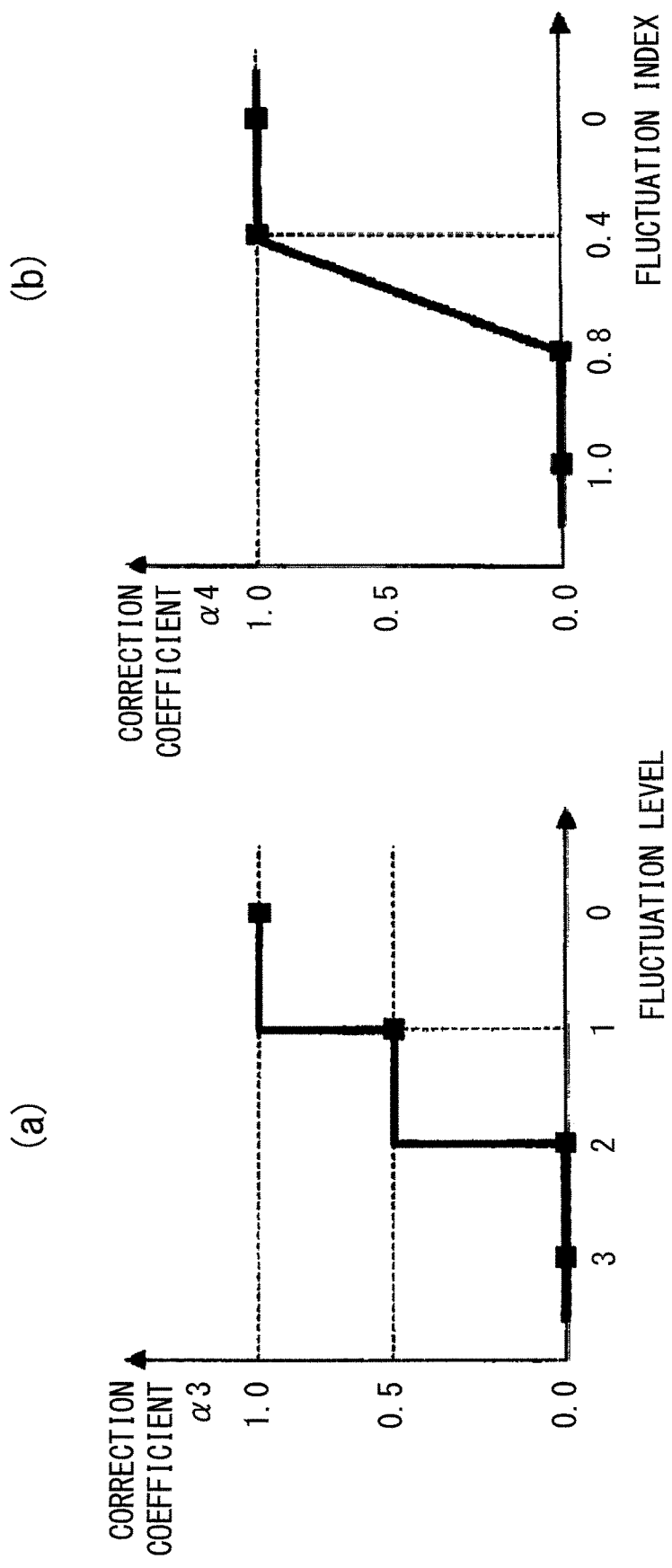
FIG. 8 is graphs showing the correlation between the fluctuation in the rearward distance and the correction coefficient α3.

FIG. 8 shows an example of a graph showing the correlation between the rearward distance fluctuation value and the correction coefficient α3.

The rearward distance fluctuation calculation unit 11 according to the present embodiment calculates, as the rearward distance fluctuation value, the standard deviation of the measurement values of the position of the lane-dividing line detected in a predetermined period (or otherwise the standard deviation of a predetermined number of consecutively detected measurement values of the position of the lane-dividing line). Subsequently, the rearward distance fluctuation calculation unit 11 outputs a fluctuation level that corresponds to the rearward distance fluctuation value to the correction coefficient setting unit 6. The fluctuation level is configured as an integer which is equal to or greater than 0, and which represents the rearward distance fluctuation value. Specifically, the fluctuation level is raised according to an increase in the rearward distance fluctuation value. When the fluctuation level output from the rearward distance fluctuation calculation unit 11 is zero, the correction coefficient setting unit 6 sets the correction coefficient α3 to 1. When the fluctuation level is 1, the correction coefficient setting unit 6 sets the correction coefficient α3 to 0.5. When the fluctuation level is equal to or greater than 2, the correction coefficient setting unit 6 sets the correction coefficient α3 to 0.

It should be noted that a fluctuation index configured as a continuous value may be used to set the correction coefficient, instead of using the fluctuation level configured as a discrete value that corresponds to the rearward distance fluctuation value. For example, a correction coefficient α4 may be calculated based on the fluctuation index as shown in FIG. 8(*b*) instead of the aforementioned correction coefficient α3, and the correction coefficient α may be set based on the correction coefficients α1, α2, and α4.

The lane departure judgment apparatus according to the second embodiment described above provides the following operations and advantageous effects.

(1) The lane departure judgment apparatus 200 includes the rearward distance fluctuation calculation unit 11 that calculates, in a time-series manner, the variance of the distance between the lane-dividing line and the optical axis 403 calculated by the rearward distance calculation unit 8. The correction coefficient setting unit 6 sets the correction coefficient α based on the road parameters and the variance calculated by the rearward distance fluctuation calculation unit 11. The forward distance calculation unit 9 corrects the yaw angle based on the correction coefficient α, and calculates the distance between the front wheel of the vehicle and the lane-dividing line based on the corrected yaw angle. The departure judgment unit 10 makes the departure judgment based on the distance thus calculated. Such an arrangement allows the departure judgment to be made with high precision regardless of the detection precision with which the lane-dividing line is detected.

The following modifications are encompassed within the technical scope of the present invention. Also, one or more of such modifications may be combined with the aforementioned embodiment.

[Modification 1]

The setting method used by the correction coefficient setting unit 6 to set the correction coefficient α is not restricted to such arrangements described above. For example, the correction coefficient may be set based on a value obtained by subtracting the width of the vehicle from the lane width. Also, as a method for calculating the correction coefficient α based on the correction coefficients α1 and α2 calculated using the respective road parameters, a weighted average may be calculated with predetermined weighting factors, instead of calculating an arithmetic average. Also, the correction coefficient α may be directly calculated based on the multiple road parameters, instead of an arrangement in which the correction coefficient α is calculated after the correction coefficients α1 and α2 are respectively calculated for the respective road parameter. Also, the smaller coefficient may be selected from among the correction coefficients α1 and α2 calculated based on the respective road parameters, and the correction coefficient thus selected may be used as the correction coefficient α.

[Modification 2]

Description has been made in the aforementioned embodiments regarding an arrangement in which the image-capturing device 1 acquires an image rearward of the vehicle. Also, the image-capturing device 1 may acquire an image forward of the vehicle. Also, the image-capturing device 1 may be mounted at a position or in a direction that differs from those described in the aforementioned embodiments.

[Modification 3]

Description has been made in the aforementioned embodiments regarding an arrangement in which the forward distance calculation unit 9 calculates the distance between the outer side of the front wheel of the vehicle and the lane-dividing line based on the distance up to the lane-dividing line calculated by the rearward distance calculation unit 8. Also, the forward distance calculation unit 9 may calculate the distance between the lane-dividing line and a given position selected as desired such as the front corner of the vehicle.

[Modification 4]

The road parameters are not restricted to the lane width and the radius of curvature of the road described above. Also, there is not necessarily a need to use the two such road parameters. For example, the correction coefficient α may be set based on the lane width alone. Also, the road parameter calculation unit 5 may calculate the lane width of the road based on information other than the lane width calculated by the lane-dividing line detection unit 4. Also, the radius of curvature of the road may be calculated based on information other than the yaw rate detected by the yaw rate detection unit 2. For example, the lane width or the radius of curvature of the road on which the vehicle is being driven may be calculated based on the present location detected by a GPS receiver or the like and the road information stored in a storage device such as an HDD.

Figure 9:
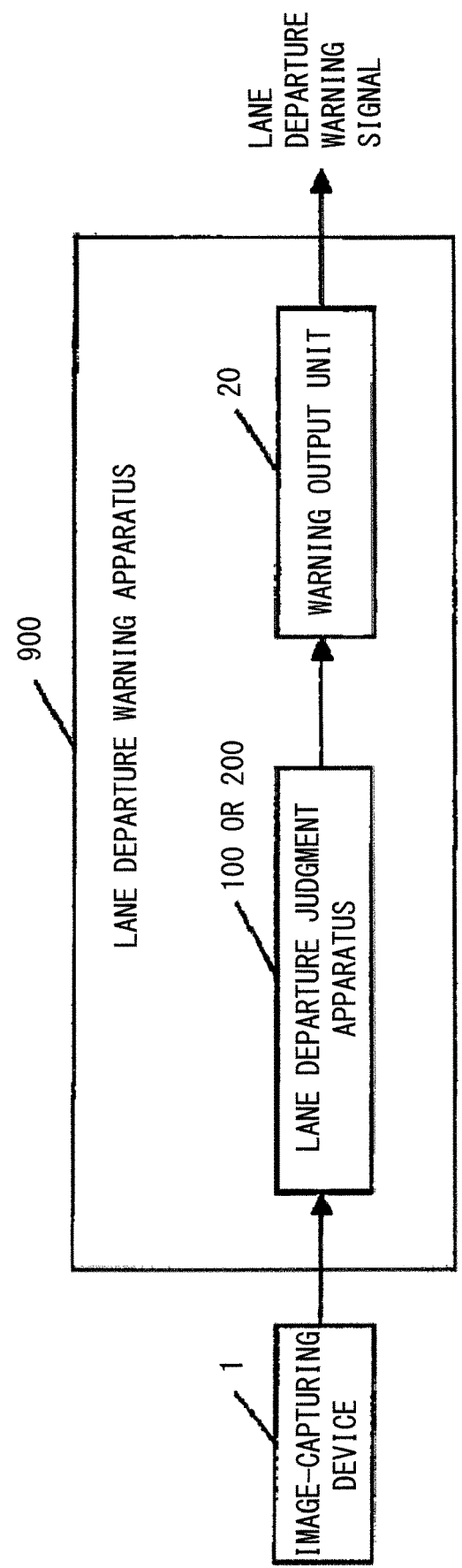
FIG. 9 is a block diagram showing a lane departure warning apparatus configured using the lane departure judgment apparatus according to the present invention.

Also, using the lane departure judgment apparatus according to the present invention, a lane departure warning apparatus may be configured to externally output a warning signal when departure of the vehicle from the lane-dividing line occurs. Specifically, as shown in FIG. 9, a lane departure warning apparatus 900 is configured including the warning output unit 20 and the lane departure judgment apparatus 100 according to the first embodiment or the lane departure judgment apparatus 200 according to the second embodiment.

The lane departure warning apparatus 900 instructs the lane departure judgment apparatus 100 or 200 to judge whether or not departure of the vehicle from the lane-dividing line occurs. When judgment has been made that departure of the vehicle from the lane-dividing line occurs, the lane departure warning apparatus 900 instructs the warning output unit 20 to externally output a vehicle departure warning signal. It should be noted that the warning output unit 20 is configured such that, when the warning disabled condition is satisfied, such a lane departure warning signal is not externally output. Examples of such warning disabled conditions include: a condition in which the driver is operating a blinker; a condition in which the detection timing is within a predetermined period (e.g., 2 seconds) of time after the driver has finished operating a blinker; a condition in which the vehicle speed is equal to or less than a predetermined speed (e.g., 70 km/h or less); and a condition in which the radius of curvature of the road is equal to or smaller than a predetermined value (e.g., 200 m or less).

Figure 10:
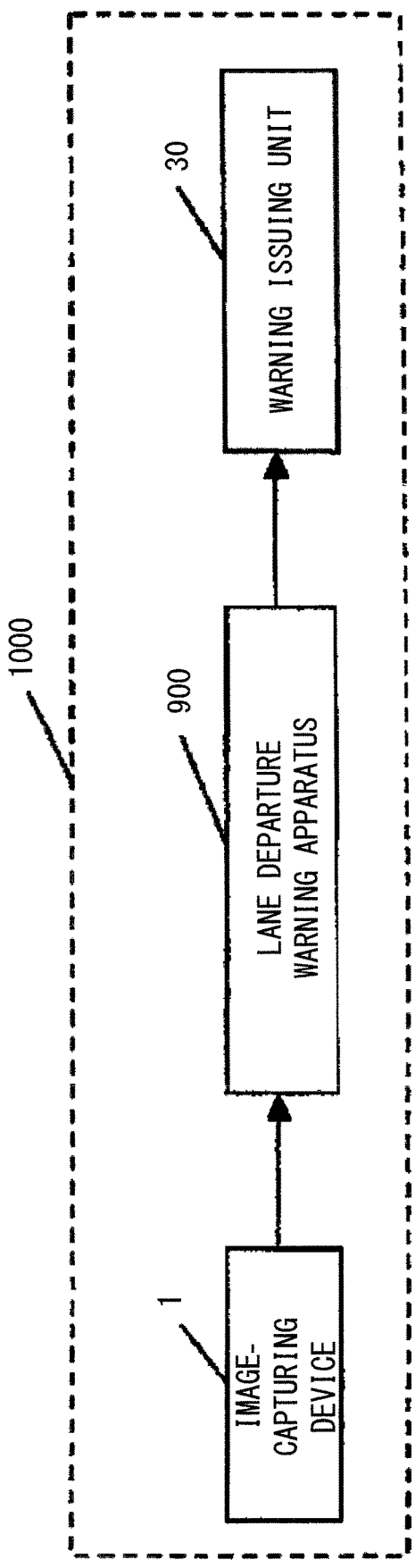
FIG. 10 is a block diagram showing a vehicle control system configured using the lane departure judgment apparatus according to the present invention.

Also, a vehicle control system may be configured using the lane departure warning apparatus 900. Specifically, as shown in FIG. 10, a vehicle control system 1000 includes at least the image-capturing device 1, the lane departure warning apparatus 900, and the warning issuing unit 30.

When the lane departure warning apparatus 900 outputs a lane departure warning signal, the vehicle control system 1000 instructs the warning issuing unit 30 to issue a lane departure warning for the driver or crew members. It should be noted that the warning issuing unit 30 is configured as a speaker that issues the information in the form of sound, or otherwise is configured as a display, a meter panel, a warning light, or the like, that issues the information in a visual form.

As described above, by configuring the lane departure warning apparatus using the lane departure judgment apparatus according to the present invention, and also by configuring the vehicle control system using such a lane departure warning apparatus, such an arrangement is capable of issuing a lane departure warning based on the high-precision lane departure judgment result obtained by the lane departure judgment apparatus. This provides an improved sense of safety and improved reliability to the driver and crew members.

The present invention is not restricted to the aforementioned embodiments. Rather, various kinds of embodiments that can be conceived within the technical scope of the present invention are also encompassed within the technical scope of the present invention so long as such embodiments do not damage the features of the present invention.

The entire contents disclosed in Japanese Patent Application No. 2012-149863 (filed on Jul. 3, 2012) are incorporated herein by reference.

REFERENCE SIGNS LIST 1 image-capturing device
2 yaw rate detection unit
3 vehicle speed detection unit
4 lane-dividing line detection unit
5 road parameter calculation unit
6 correction coefficient setting unit
7 yaw angle calculation unit
8 rearward distance calculation unit
9 forward distance calculation unit
10 departure judgment unit
100, 200 lane departure judgment apparatus
1000 vehicle control system

The invention claimed is:

1. A lane departure judgment apparatus comprising:
a computer configured to detect a lane-dividing line of a road on which a vehicle is driven based on an image information output from an image-capturing device mounted on the vehicle that acquires an image of an area outside the vehicle, and to judge whether or not there is a risk of departure of the vehicle from the lane-dividing line based on a distance between the vehicle and the lane-dividing line, by executing a predetermined program, wherein:

the computer is configured to calculate the distance between the vehicle and the lane-dividing line to become smaller and make an earlier judgment that there is the risk of departure of the vehicle from the lane-dividing line based on the calculated distance when a radius of curvature of the road is determined to be greater than a predetermined radius of curvature than when the radius of curvature of the road is determined to be not greater than the predetermined radius of curvature.

2. A lane departure judgment apparatus comprising:

a computer configured to, by executing a predetermined control program, perform the functions of:

detecting a lane-dividing line of a road on which a vehicle is driven based on an image information output from an image-capturing device mounted on the vehicle that acquires an image of an area outside the vehicle;

calculating a distance between the lane-dividing line and an optical axis of the image-capturing device for each of predetermined periods;

calculating a yaw angle of the vehicle with respect to the lane-dividing line;

setting a correction coefficient for adjusting the calculated yaw angle of the vehicle with respect to the lane-dividing line based on a road parameter which represents characteristics of a road on which the vehicle is being driven;

adjusting the calculated yaw angle of the vehicle with respect to the lane-dividing line by multiplying the calculated yaw angle of the vehicle with respect to the lane-dividing line by the set correction coefficient; and judging whether or not there is a risk of departure of the vehicle from the lane-dividing line based on the adjusted yaw angle and the calculated distance between the lane-dividing line and the optical axis, wherein:

the computer is configured to set the correction coefficient for adjusting the calculated yaw angle based on a radius of curvature of the road which is configured as the road parameter; and the computer is configured to calculate the distance between the vehicle and the lane-dividing line to become smaller by using the adjusted yaw angle and make an earlier judgment that there is the risk of departure of the vehicle when the radius of curvature of the road is determined to be greater than a predetermined radius of curvature than when the radius of curvature of the road is determined to be not greater than the predetermined radius of curvature.

3. The lane departure judgment apparatus according to claim 2, wherein:

the computer adjusts the calculated yaw angle based on at least one from among a lane width of the road and a radius of curvature of the road, which are each configured as the road parameter.

4. The lane departure judgment apparatus according to claim 2, wherein the computer is further configured to perform the function of:

calculating a fluctuation that occurs in a time-series manner in the calculated distance between the lane-dividing line and the optical axis, wherein:

the computer adjusts the calculated yaw angle based on the road parameter and the calculated fluctuation, and judges whether or not there is the risk of departure of the vehicle based on the adjusted yaw angle and the calculated distance between the lane-dividing line and the optical axis.

5. A lane departure warning apparatus comprising:

the lane departure judgment apparatus according to claim 3, wherein:

the lane departure warning apparatus outputs a warning signal which indicates lane departure based on a departure judgment result obtained by the lane departure judgment apparatus.

6. A vehicle control system comprising:

a lane departure warning apparatus according to claim 5, wherein:

the vehicle control system issues a warning based on an output result of a warning signal output from the lane departure warning apparatus.

* * * * *